United States Patent [19]
Schofield et al.

[11] Patent Number: 5,333,223
[45] Date of Patent: Jul. 26, 1994

[54] PLASTIC FIBER ALIGNMENT FERRULE WITH POLISHING PEDESTAL

[75] Inventors: Philip W. Schofield, Oak Park; James W. McGinley, Schaumburg, both of Ill.

[73] Assignee: Methode Electronics, Inc., Chicago, Ill.

[21] Appl. No.: 47,116

[22] Filed: Apr. 13, 1993

[51] Int. Cl.⁵ .......................... G02B 6/00; G02B 6/36
[52] U.S. Cl. ...................................... 385/84; 264/1.1; 65/3.11
[58] Field of Search .................. 385/76, 77, 78, 80, 385/84, 85; 51/283 R, 283 E, .298; 225/93, 94; 264/1.1, 1.2, 1.5, 2.7; 65/3.11

[56] References Cited
U.S. PATENT DOCUMENTS

| | | | |
|---|---|---|---|
| 4,107,242 | 8/1978 | Runge | 385/84 X |
| 4,173,389 | 11/1979 | Curtis | 385/78 X |
| 4,512,630 | 4/1985 | Runge | 350/96.21 |
| 4,634,214 | 1/1987 | Cannon, Jr. et al. | 350/96.20 |
| 4,787,698 | 11/1988 | Lyons et al. | 385/84 X |
| 4,789,216 | 12/1988 | Schrott | 385/84 |

Primary Examiner—Akm E. Ullah
Attorney, Agent, or Firm—David L. Neuman

[57] ABSTRACT

An injection molded plastic fiber alignment ferrule is provided with a polishing pedestal. The ferrule has an opening therethrough for receiving the end of a fiber, which extends beyond the pedestal. The fiber is cleaved and the end is severed. The ferrule is polished to remove the pedestal, resulting is a smoothly polished end surface.

18 Claims, 2 Drawing Sheets

PLASTIC FIBER ALIGNMENT FERRULE WITH POLISHING PEDESTAL

This application is related to U.S. Pat. No. 5,193,133 issued on Mar. 9, 1993.

BACKGROUND OF THE INVENTION

The present invention pertains to fiber optical connectors, and more particularly, to an alignment ferrule for a fiber optical connector made from injection molded plastic having a pedestal projecting from an end surface of the ferrule for receiving and surrounding a fiber, the pedestal being readily removed by polishing after bonding of the fiber to the ferrule to leave a smoothly polished end surface on the ferrule. In other aspects, the present invention pertains to a method of making a fiber optical connector using an injection molded plastic ferrule with a raised pedestal at one end.

It is known in the art to make a fiber optical connector by securing a fiber optic cable to a ceramic or plastic ferrule. The ferrule is generally cylindrical and has an opening extending therethrough. The opening has a diameter slightly larger than the diameter of the fiber. In the communications industry, a standard ferrule diameter is 125 microns (±2 microns). The fiber, which protrudes from an end of the cable, is inserted through the opening in the ferrule and bonded to the ferrule by use of an adhesive, for example, an epoxy. A drop of epoxy is usually applied to the fiber exterior of the opening to protect the end of the fiber. The end of the fiber protruding from the ferrule and the epoxy is cleaved using a diamond tipped tool. The end of the ferrule is then polished. Epoxy surrounding the fiber adjacent the end of the ferrule causes difficulty in locating the cleave position. The fiber can be severed at different distances from the end of the ferrule. The fiber might undesirably break below the end surface of the ferrule. Since it is difficult to predict how the fiber will be severed after it is cleaved, proper polishing of the ferrule end is a problem.

With a ceramic ferrule, expensive abrasives must be used to grind and polish the end of the ferrule. The cost of the ceramic material in a ferrule and the processing of same is considerably more than the cost of a plastic ferrule and its processing, hence, it would be desirable to utilize a relatively inexpensive plastic. Further, it is desired to automate the process of assembling an optical fiber to a ferrule. Present ferrules of either ceramic or plastic do not have a relatively fixed point of extension of the fiber from the ferrule during assembly and thus do not lend themselves readily to automation.

Runge, U.S. Pat. No. 4,512,630, discloses an optical fiber connector utilizing a pair of connectors each having a tiny transparent flexible index matching dome of silicone rubber or equivalent material. The connectors have conically hollow receiving surfaces. The fiber ends are aligned, and the domes touch and flex completing the optical connection. It is difficult to break the fiber to achieve a flat and perpendicular end face, and thus degradation of the connection between the aligned fibers often results.

SUMMARY OF THE INVENTION

An object of the present invention is to provide a molded plastic ferrule for a fiber optic connector having a raised pedestal at one end which is integral with the ferrule, which is further inexpensive to make and which overcomes disadvantages and deficiencies of prior ferrules.

Another object of the present invention is to provide an injection molded plastic ferrule for a fiber optic connector which includes a raised pedestal at one end having a height less than the diameter of the pedestal base for facilitating assembly of the ferrule and fiber with the end of the fiber located closely proximate the end surface of the ferrule, whereby the end of the ferrule can be easily polished to remove the pedestal and form a uniformly polished end surface.

Yet another object of this invention is to provide a molded plastic 2.5 mm ferrule for a fiber optic connector having a raised pedestal adjacent one end surrounding the fiber for facilitating manufacture of the ferrule with a uniformly polished end surface. Other objects and advantages of this invention will be made more apparent hereinafter.

BRIEF DESCRIPTION OF THE DRAWINGS

There is shown in the attached drawings a presently preferred embodiment of the present invention, wherein like numerals in the various views refer to like elements, and wherein.

DETAILED DESCRIPTION OF THE PRESENTLY PREFERRED EMBODIMENTS

Figure 1:
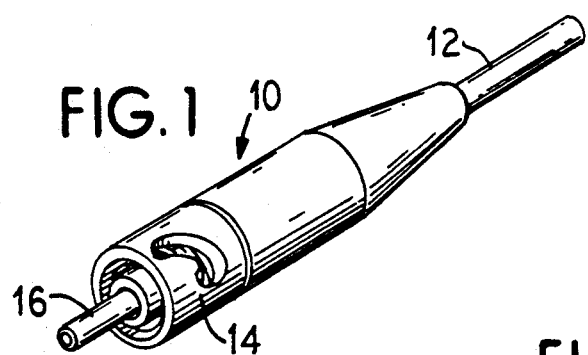
FIG. 1 is a perspective view of a fiber optical connector embodying the present invention.
Figure 2:
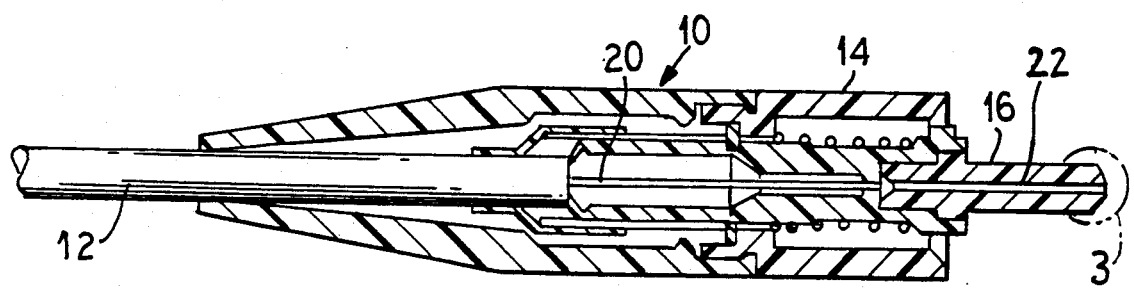
FIG. 2 is a longitudinal cross-section of the fiber optical connector of FIG. 1.

Referring to FIGS. 1 and 2, there is shown a fiber optic connector 10 for cable 12 which includes within a housing 14 a plastic ferrule 16 of the present invention. The cable 12 is of conventional construction and includes a protective coating or jacket 18 surrounding strain members (not shown) and a fiber 20, which fiber is secured within the ferrule 16, as will be more fully explained hereinafter.

The ferrule 16 is injection molded, preferably from a partially glass filled or mineral filled resin, such as polyphenylene sulfide (PPS) or liquid crystal polymer (LCP). The ferrule 16 is relatively inexpensive as compared to a ceramic ferrule. The ferrule 16 has a longitudinal opening or passage 22 therethrough. The entry end of the opening 22 is tapered to facilitate entry of the fiber 20 during assembly of the fiber 20 within the ferrule 16.

Ordinarily, known ferrules are formed with a flat end surface. A 2.5 mm ferrule is currently standard in the industry. An adhesive, such as epoxy, is introduced into the opening in the ferrule. The fiber from the end of the cable is inserted into the opening in the ferrule until it extends from the end surface of the ferrule. The epoxy bonds the fiber to the ferrule. The fiber is cleaved or cut off as close as possible to the end surface. The epoxy may surround the fiber sticking out from the end surface of the ferrule making cleaving close to the end surface difficult. The fiber could indesirably shear below the end surface. Polishing the end of the ferrule to bring the fiber to the end surface can be difficult and often results in undesirably polishing away more ferrule than is needed or desired. Adhesive beads have been known to shear away from the ferrule end surface during polishing.

Figure 3:
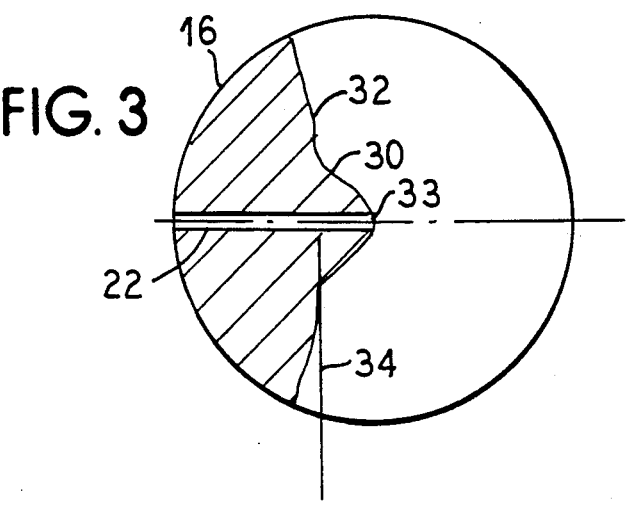
FIG. 3 is an enlarged detail view of an end of the ferrule of the fiber optical connector prior to polishing and illustrating the raised pedestal which surrounds the outlet end of the opening through the ferrule.

Turning to FIG. 3, to overcome these problems, the ferrule 16 of the present invention is injection molded with a pedestal 30 extending outwardly from an end surface 32. The pedestal 30 is annular and surrounds the opening 22 in the ferrule 16. Preferably, the height of the pedestal 30 is at least twice the diameter of the fiber 20. The pedestal 30 provides a consistent and dependable support for the fiber 20 while polishing. Furthermore, the height of the pedestal 30 is greater than an end face 33 (see FIG. 5) diameter. The pedestal 30 is formed by conical walls which form an angle $\theta$ with a pedestal base 34 in which, in the preferred embodiment, $\theta$ is between 35 and 55 degrees. Such parameters result in a pedestal height which is between ¼ and ¾ the diameter of the pedestal base 34.

Figure 4:
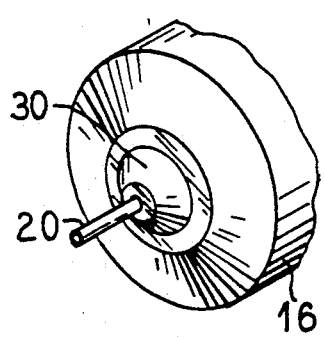
FIG. 4 is a detail perspective view illustrating the position of the fiber in the ferrule at the beginning of assembly of the fiber to the ferrule.
Figure 5:
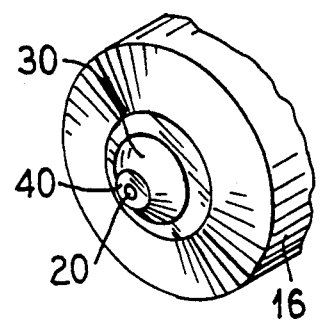
FIG. 5 is a detail perspective view illustrating the fiber cleaved at the pedestal surface.
Figure 6:
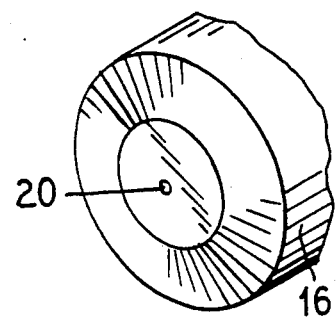
FIG. 6 is a detail perspective view illustrating the end of the ferrule after polishing is complete and the pedestal is removed.

Turning to FIGS. 4-6, there is better shown the method of connecting a fiber to a ferrule. FIG. 4 illustrates a ferrule 16 of one embodiment of the present invention made with the pedestal 30. In the assembly process, the optical fiber is stripped by removing its buffer for a distance of ⅛ inch to ¼ inch of the end. The stripped portion of the fiber 20 precedes the buffered portion in entering the rear of the ferrule 16 during the assembly operation. The fiber 20 is epoxied into the ferrule 16 with the free end of the fiber 20 extending beyond the pedestal 30.

The fiber 20 is cleaved adjacent a surface 40 of the pedestal 30 using a diamond or like tipped tool. The free end of the fiber 20 is broken away. The fiber 20 is substantially at the surface 40, as seen in FIG. 5. To remove the fiber 20 above the pedestal 30 a piece of abrasive, e.g., 12 micron lapping film, is applied over the fiber 20, and 10-15 small circular strokes are lightly completed.

The ferrule 16 is inserted into a fixture comprising a generally circular base of substantial diameter (on the order of 1 to 1-½ inches) with a cylinder extending from the base. The cylinder has a hole for receiving the ferrule 16. The fixture is positioned over an abrasive sheet on the order of 10-12 microns. The abrasive sheet preferably comprises an aluminum oxide film. The end of the ferrule 16 engages the abrasive sheet. The fixture is moved to make about 20 revolutions or circular strokes to remove the raised pedestal 30. The end surface of the ferrule 16 is cleaned with alcohol. Then, polishing is completed by placing a sheet of 0.3 micron abrasive thereon and completing 5-10 circular strokes approximately 2 inches in diameter.

If a rounded end is desired on the ferrule, the abrasive sheet may be positioned on a resilient surface, e.g., a sheet of rubber. If a flat end is desired on the ferrule, the abrasive sheet may be positioned on a relatively hard surface, e.g., a glass plate. In any case, the resilient surface finish on the end surface of the injection-molded ferrule is at least equal to that of the finish on a ceramic ferrule at a small fraction of the price of the ceramic ferrule.

The polished end surface of the ferrule can be relatively held at a fixed distance from the opposite end of the ferrule. This permits the ferrule of the present invention to be more readily adapted to automated manufacture of a connector. The pedestal feature eliminates the need for an epoxy bead, therefore reducing the installation time, as well as the scrap. Further, the pedestal 30 reduces the amount of expensive lapping film consumed by reducing the amount of ferrule material to be removed in the polishing process.

The present invention is easily adapted for the standard 2.5 millimeter ferrule in use commercially. Though the connector is shown with a single ferrule, it is understood that the invention can readily be used with connectors having multiple ferrules and fibers.

Figure 7:
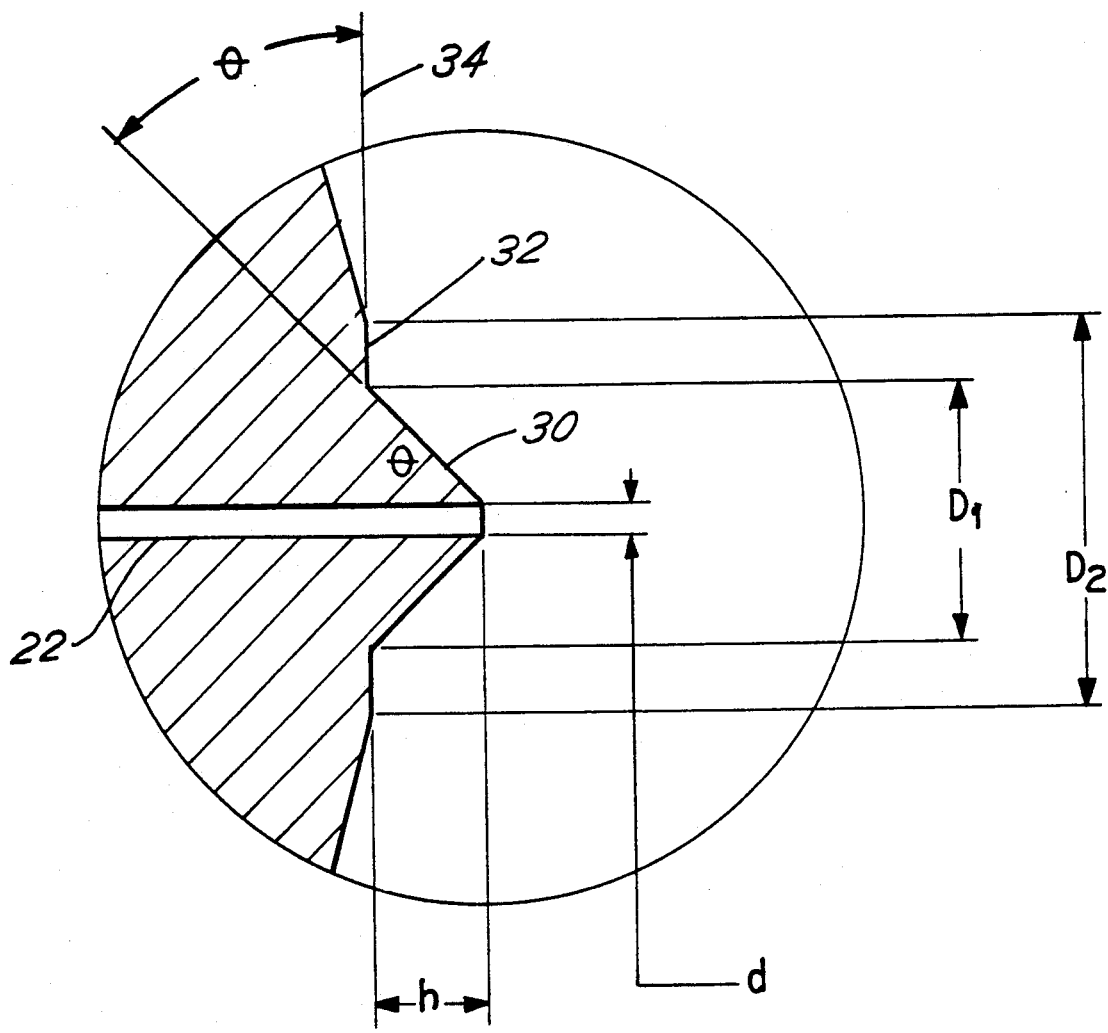
FIG. 7 is an enlarged detail view similar to FIG. 3 which provides specific dimensions for a preferred embodiment.

Reference is now made to FIG. 7 which shows a preferred embodiment of the polishing pedestal of the present invention. FIG. 7 shows a pedestal 30 having a base diameter, $D_1$, of 0.040 inch, a height, h of 0.018 inch and an aperture of fiber hole having a diameter, d of 0.004 inch. In the preferred embodiment shown in FIG. 7, the diameter, d of the pedestal end face 33 is approximately the same as the diameter, d, of the fiber hole, i.e., 0.004 inch, because the conical side wall of the pedestal slopes down so that the outer end face is essentially no more than an annular edge. It will further be seen that the angle $\theta$ defined between the pedestal base line 34 and the conical pedestal side wall is 45 degrees.

It will be seen from the foregoing preferred dimensions that the pedestal end face 33 diameter, d, is approximately only one tenth of the pedestal base diameter $D_1$. Also, the pedestal height, h is approximately 4.5 times the pedestal end face diameter d, and the pedestal height is approximately 45% of the pedestal base diameter, $D_1$. These dimensions and ratios are designed to achieve two important but different objectives, having in mind that it is intended that the pedestal be ground away during a polishing operation so that the final polished ferrule end will appear as shown in FIG. 6.

One objective is to provide optimum support for the fiber optic member during the removal of the pedestal in a polishing operation. The other major objective is to design a pedestal which can be readily removed in a polishing operation without difficulty and without the need to remove excess material. In order to achieve such objectives, it is desirable to provide a pedestal which has an end face diameter, d, that is significantly less than the diameter, $D_1$, of the pedestal base, i.e., no more than one-half the diameter, $D_1$, of the pedestal base, and preferably no more than one-third the diameter $D_1$, of the pedestal base.

It is also desirable to provide a pedestal height, h, which is at least two times the diameter, d, of the pedestal end face 33, and preferably at least three times the diameter, d, of the pedestal end face 33. With respect to the relationship between the pedestal height, h, and the pedestal base diameter, $D_1$, it is desirable that the height, h, be between one-fourth and three-fourths the pedestal base diameter, $D_1$, and preferably between at least one-third the pedestal base diameter, $D_1$, but not more than three-fourths the pedestal base diameter, $D_1$. The angle $\theta$ between the conical pedestal side wall and the pedestal base is preferably in the range of 35 degrees to 55 degrees, and preferably approximately 45 degrees.

While we have shown a presently preferred embodiment of the present invention, it will be understood that various changes and modifications may be made in the invention, and it is intended that the invention will be limited only within the scope of the appended claims.

We claim:

1. A molded plastic ferrule for a fiber optic connector comprising an elongated body having an opening therethrough, said opening having an entry end and an exit end, said entry end for receiving a fiber optic member into said opening, said ferrule having an integral, removable pedestal formed to surround said exit end of said opening, said pedestal having a generally conical shape with a height at least equal to diameter of a pedestal end face, and the conical pedestal side wall defining an angle between 35 degrees and 55 degrees with respect to a base of said pedestal wherein the pedestal removal occurs at least partially by polishing the pedestal from the end face to the base.

2. The molded plastic ferrule as defined in claim 1 wherein said height of said pedestal is at least two times said diameter of said pedestal end face.

3. The molded plastic ferrule as defined in claim 2 wherein said height of said pedestal is at least three times said diameter of said pedestal end face.

4. A molded plastic ferrule for a fiber optic connector comprising an elongated body having an entry end and an exit end, said entry end for receiving a fiber optic member into an opening, said ferrule having an integral, removable pedestal formed to surround said exit end of said opening, said pedestal having a generally conical shape with a height at least two times the diameter of said opening at an end face, and the conical pedestal side wall defining an angle between 35 degrees ad 55 degrees with respect to a base of said pedestal wherein the pedestal removal occurs at least partially by polishing the pedestal from the end face to the base.

5. The molded plastic ferrule as defined in claim 4 wherein said height is at least three times the diameter of said opening.

6. A molded plastic ferrule for a fiber optic connector comprising an elongated body having an opening diameter therethrough, said opening having an entry end and an exit end, said entry end for receiving a fiber optic member into said opening, said ferrule having an integral, removable pedestal formed to surround said exit end of said opening, said pedestal having a generally conical shape with an end face diameter which is not more than one-third of the diameter of a base of said pedestal, and the conical pedestal side wall defining an angle between 35 degrees and 55 degrees with respect to said base of said pedestal wherein the pedestal removal occurs at least partially by polishing the pedestal from the end face to the base.

7. The molded plastic ferrule as defined in claim 6 wherein said end face diameter is not more than one-half the diameter of said base of said pedestal.

8. A molded plastic ferrule for a fiber optic connector comprising an elongated body having an opening diameter therethrough, said opening having an entry end and an exit end, said entry end for receiving a fiber optic member into said opening, said ferrule having an integral, removable pedestal formed to surround said exit end of said opening at an end face of the pedestal, said pedestal having a generally conical shape with a height which is one-fourth to three-fourths the diameter of a base of said pedestal, and the conical pedestal side wall defining an angle between 35 degrees and 55 degrees with respect to said base of said pedestal wherein the pedestal removal occurs at least partially by polishing the pedestal from the end face to the base.

9. The molded plastic ferrule as defined in claim 8 wherein said height of said pedestal is one-third to three-fourths the diameter of said base of said pedestal.

10. The molded plastic ferrule as defined in claim 8 wherein said conical pedestal side wall defines an angle of approximately 45 degrees with said base of said pedestal.

11. A molded plastic ferrule for a fiber optic connector comprising an elongated body having an opening therethrough, said opening having an entry end and an exit end, said entry end for receiving a fiber optic member into said opening, said ferrule having an integral pedestal formed to surround said exit end of said opening, said pedestal having a generally conical shape with a height at least equal to the diameter of the pedestal end face, the conical pedestal side wall defining an angle between 35 degrees and 55 degrees with respect to a base of said pedestal, said height of said pedestal being at least two times the diameter of said opening, said pedestal end face diameter being not more than one-third of the diameter of said base of said pedestal, and said height of said pedestal being from one-fourth to three-fourths said diameter of said base of said pedestal.

12. The molded plastic ferrule as defined in claim 11 wherein said height of said pedestal is at least three times said diameter of said pedestal end face.

13. The molded plastic ferrule as defined in claim 11 wherein said height is at least three times said diameter of said opening.

14. The molded plastic ferrule as defined in claim 11 wherein said end face diameter is not more than one-half the diameter of said base of said pedestal.

15. The molded plastic ferrule as defined in claim 11 wherein said height of said pedestal is one-third to three-fourths the diameter of said base of said pedestal.

16. The molded plastic ferrule as defined in claim 11 wherein said conical pedestal side wall defines an angle of approximately 45 degrees with said base of said pedestal.

17. A molded plastic ferrule for a fiber optic connector comprising an elongated body having an opening therethrough, said opening having an entry end and an exit end, said entry end for receiving a fiber optic member into said opening, said ferrule having an integral pedestal formed to surround said exit end of said opening, said pedestal having a generally conical shape with a height equal to at least three times the diameter of the pedestal end face, the conical pedestal side wall defining an angle between 40 degrees and 50 degrees with the base of said pedestal, said height of said pedestal being at least two times the diameter of said opening, said pedestal end face diameter being not more than one-third the diameter of said base of said pedestal, and said height of said pedestal being from one-third to three-fourths said diameter of said base of said pedestal.

18. The molded plastic ferrule as defined in claim 17 wherein said conical pedestal side wall defines a relatively sharp annular edge at the end face of said pedestal, said diameter of said opening being approximately equal to said diameter of said pedestal end face.

* * * * *